Oct. 2, 1962 S. L. RIDGWAY 3,056,662
EXHAUST CONTROL APPARATUS
Filed Feb. 9, 1959 2 Sheets-Sheet 1

STUART L. RIDGWAY
INVENTOR.

BY
ATTORNEYS

Oct. 2, 1962 S. L. RIDGWAY 3,056,662
EXHAUST CONTROL APPARATUS
Filed Feb. 9, 1959 2 Sheets-Sheet 2

TO AFTERBURNER

STUART L. RIDGWAY
INVENTOR.

BY

ATTORNEYS

United States Patent Office 3,056,662
Patented Oct. 2, 1962

3,056,662
EXHAUST CONTROL APPARATUS
Stuart L. Ridgway, Redondo Beach, Calif., assignor to Thompson Ramo Wooldridge Inc., Los Angeles, Calif., a corporation of Ohio
Filed Feb. 9, 1959, Ser. No. 792,091
4 Claims. (Cl. 23—288)

This invention is concerned with a method and apparatus for removing noxious matter from exhaust gas of internal combustion engines by removing lead compounds and burning the combustible content of the exhaust gas remaining in an afterburner subject to contamination by lead compounds.

While not limited thereto, the invention is herein described with reference to improvements in the automotive engine exhaust gas control art discussed, for example, in co-pending patent applications Serial Nos. 677,078 and 765,976, (now abandoned), each entitled "Exhaust Control Method and Apparatus," filed on August 8, 1957, and October 8, 1959, respectively, by Stuart L. Ridgway, and assigned to the same assignee as the present invention.

As is known, it is possible to eliminate most of the undesirable constituents of internal combustion exhaust gas by mixing the exhaust gas with air and burning the mixture in the presence of a catalyst. The burning of the mixture may be accomplished in a combustion chamber containing device popularly known as an afterburner. Many known afterburners are arranged to have the combustion take place in the presence of a catalytic agent. While prior art catalytic afterburners have been used to reduce the noxious matter in automotive exhaust gas, the exhaust gas from modern automobile engines usually contains catalytic poisoning agents such as lead compounds which reduce substantially the life of the catalyst. Therefore catalytic afterburners for gasoline engines have not proven entirely satisfactory. Moreover, it is likely that at least some of the heavier particulates will contribute to various undesirable contaminations even in an afterburner which does not depend on any catalytic agent.

Accordingly, one of the more important objects of this invention is to provide an improved and efficient method and apparatus for removing lead compounds from the exhaust gas prior to its being subjected to catalytic burning.

Another of the more important objects of the present invention is to provide an improved means for removing heavy compounds from exhaust gas over the entire range of automobile operating conditions whereby the afterburner is substantially immune to poisoning or contamination.

The foregoing and related objects are realized in a novel and improved exhaust gas treating method and apparatus wherein the exhaust gas to be treated is first subjected to lead compounds separation in a cyclone type separator. The cleaned exhaust gas is then subjected to combustion in an afterburner.

In one form of the invention, the path of the exhaust gas flow is defined by an acoustical barrier, a free vortex separator and a catalytic afterburner. The exhaust gas to be treated is first passed through the acoustical barrier, through the free vortex separator and then through the afterburner. The acoustical barrier reduces substantially the random turbulence of the exhaust gas whereby reception in the free vortex separator of the exhaust gas from the acoustical burner will not be influenced materially by the relatively high frequency vibrations often present in exhaust gas from an internal combustion gasoline engine. The free vortex separator functions to remove substantially all of the heavier elements and particles in the exhaust gas. Since lead compounds are heavier than most of the exhaust gas components, lead compounds will be separated in the free vortex separator. The cleaned exhaust gas is then presented to the catalytic afterburner when the combustion of the exhaust gas is completed. The catalytic agents within the afterburner will have a relatively long life because of the removal of catalytic poisoning agents, such as the lead compounds.

The subject matter which is regarded as this invention is particularly pointed out and distinctly claimed in the concluding portion of this specification. The invention, however, as to its organization and method of operation, together with further objects and advantages thereof will best be understood by reference to the following description taken in connection with the accompanying drawings in which:

Figure 1:
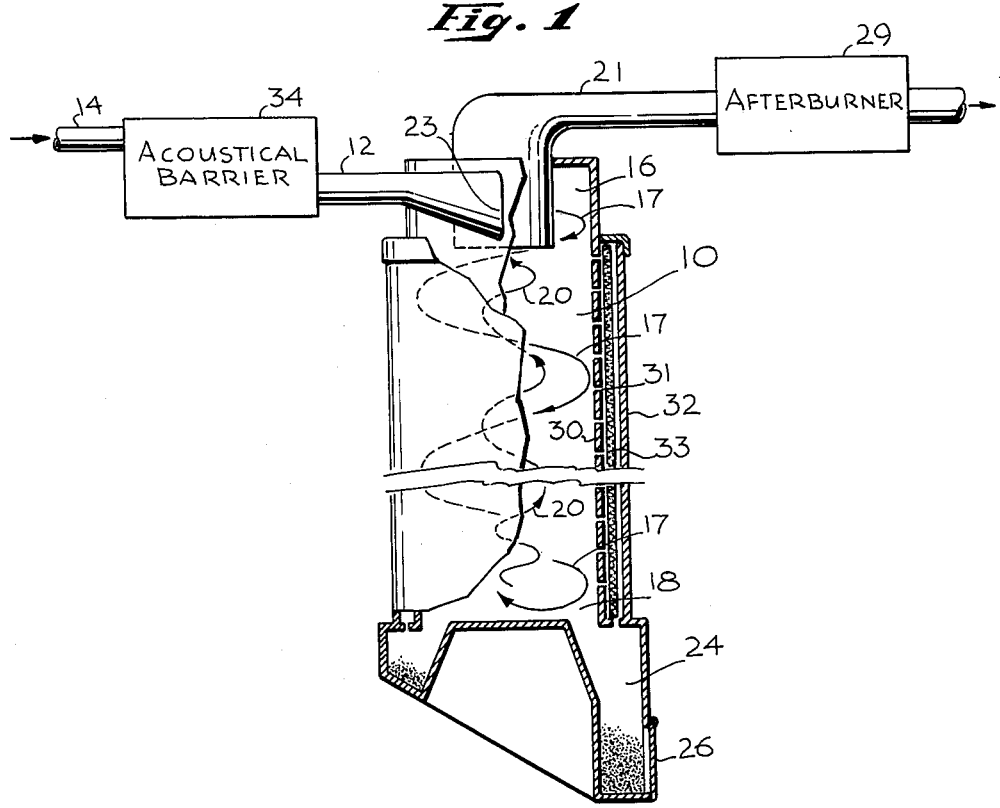
FIG. 1 is a partially cutaway side view of one embodiment of this invention.

Referring now to the drawings, wherein like numerals refer to similar parts, in FIG. 1, according to the present invention there is shown a cylindrical free vortex separator 10 connected by an inlet pipe 12 to receive exhaust gas from the exhaust pipe 14 receptive of incompletely burned exhaust gas from a source such as an automobile engine (not shown). The inlet pipe 12 directs the exhaust gas to be cleaned along the inner periphery of one end 16 of the free vortex separator 10. The exhaust gas spirals, as shown by the arrows 17, from the point of admission toward the other end 18 of the free vortex separator where it then approaches the center of the vortex and spirals, as shown by the arrows 20, toward the first end 16 and is exhausted through an exhaust tube 21 adjacent to the point of admission of the exhaust gas.

The exhaust tube 21 is positioned to receive the apex of the free vortex and is circular with a diameter approximately one-half as great as that of the separator itself. The exhaust tube should extend into the separator chamber a distance which will reduce the likelihood of any turbulence in the region of the inlet pipe 12 causing undesired catalytic contaminants to be thrown into the apex of the vortex. Thus the tube 21 should extend into the chamber a distance slightly greater than the width of the opening 23, of the inlet pipe 12.

As is known with free vortex separators the ratio of the diameter of the cylindrical vortex chamber to the length of the vortex chamber should be between 3:1 and 50:1. By providing such a ratio between the length and diameter, a true free vortex is obtainable. When a cyclone type dust separator operates as a free vortex, the operation is substantially independent of gravity, thus the inlet pipe 12 may be at the top end of the chamber (FIG. 1) or at the bottom, or the separator 10 may have a horizontal axis. The provision of a horizontal axis may have certain advantages if the afterburner system is to be secured under the floor of an automobile. The free vortex separator is substantially more efficient in removing heavy particles from a gas than certain other swirl type separators and such an efficient separator when used in combination with afterburners will result in extended trouble-free operation of the afterburner. Moreover, because of the fact that there are no relatively moving blades or impellers which will collect contaminants, periodic maintenance of the separator itself will be minimized.

The speed of rotation of the free vortex is such that the pressure at the axial center of the chamber approaches zero and the velocity of the gas along this low pressure line is very high with nearly all of the pressure or static energy being converted to kinetic energy. As a result of the rapid spiralling of the gas within the separator 10, heavy contaminants of any type, including substantially all lead compounds, in the exhaust gas will be thrown against the sides of the chamber and there carried by the axial movement of the cleaned exhaust gas toward a waste container 24 at the end 13 of the chamber.

The material collected in the container 24 may be removed periodically from the vortex separator 10 through a cleanout opening 26. Since the cleanout opening 26 will usually be mounted to take advantage of gravity during cleaning, it is shown at the bottom of the container and at a point remote from the vortex itself. However, if the separator were inverted, both the container 24 and the cleanout opening 26 would be modified. A convenient time for accomplishing removal of waste material from the container 24 would be during grease and lubrication servicing of the associated automobile. In this way the vortex separator will extend appreciably the life of an afterburner 29, and is particularly useful if the afterburner contains a catalytic agent which would be poisoned by lead compounds.

The efficiency of a cyclone type dust separator is dependent upon the flow velocity and turbulence thereof. A major cause of turbulent flow is caused by the existence of a boundary layer adjacent to the inner surface 30 of the separator 10. Thus there is a shearing force between the boundary layer and the inner vortex. During certain operating conditions the boundary layer thickness will increase to a degree causing substantial turbulence in the form of cross flow between the boundary layer and the spiralling gases. It has been found that regulation of the boundary layer will suppress this type of turbulence, reduce the kinetic losses through the separator 10 and increase the cleaning efficiency. One arrangement for regulating the thickness of the boundary layer is shown in FIG. 1, wherein there are provided small apertures or pores 31, which allow the boundary layer to leak off either to the atmosphere or to a conduit means 32 which conducts the boundary layer and any contaminents therein to the waste container 24. From experience with boundary layer control, it is known that the amount of air that need be removed by the pores 31 is small. Therefore in an afterburner system it may prove most practical to simply dump this small portion. If the air is dumped, a major portion of its contamination content may be collected in a collection means such as a fibrous filter 33 placed adjacent to or in the pores 31.

For cyclones attached to automobile engines, wherein the above-described invention may be most widely used, the pulsations of flow created during the exhaust from separate cylinders may cause undesirable variation of input velocity to the separator 10. In certain types of operation or with certain types of automotive engines, it will be desirable to reduce the vibrations and variations within the exhaust gas by the use of an acoustical barrier 34 between the engine and the free vortex separator 10. Such an acoustical barrier 34 will eliminate undesirable turbulence within the vortex chamber.

Figure 2:
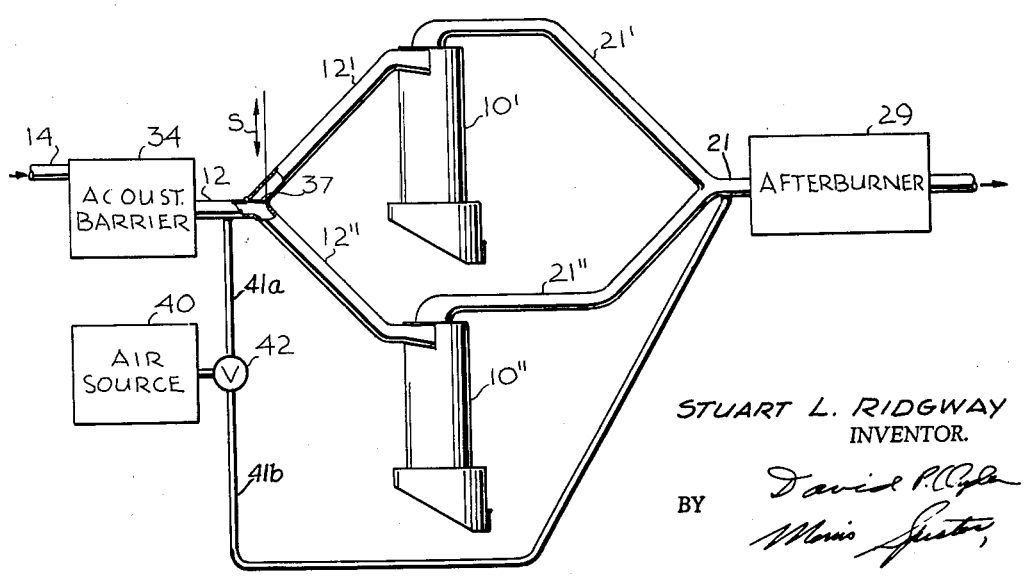
FIG. 2 is a plan view of another embodiment of this invention.

Another problem involved in the use of a free vortex separation system is the variation of throughput (rate of flow of materials including fuel vapors, air, water vapor, carbon dioxide, etc.) of the automobile engine. Thus with low throughput the input velocity to the vortex chamber will be low and with increased throughput the input velocity will be much higher. With a range of operation normal to the passenger car automotive system, it is desirable to have the vortex separation efficiency at rather low engine throughputs such as 10 c.f.m. and at the same time have efficient cleaning of heavy compounds in the vortex at much higher throughputs such as 200 c.f.m. (cubic feet per minute). One simple means of accomplishing this type of range of operation is shown in FIG. 2 wherein there is provided a plurality, such as two free vortex separators 10′ and 10″, connectable in parallel between the acoustical barrier 34 and the afterburner 29 by the common inlet pipe 12 which divides into two functionally parallel inlet pipes 12′ and 12″ and two functionally parallel exhaust tubes 21′ and 21″ which subsequently join to form the common tube 21. Since the maximum throughput occurs during operation of the power jet of the carburetor system (as is well known in the carburetor art), it would be a relatively simple matter to obtain signal information S (vacuum) from a power jet operating device, such as the intake manifold (which is one of the most common arrangements for obtaining maximum power from an automobile engine), to open a valve 37 and thus to cause the exhaust gas to be conducted through the parallel inlet pipes 12′ and 12″ to both of the vortex separators 10′ and 10″ only when the power jet is in operation.

Further control of the exhaust gas flow through the separator is obtainable because the complete combustion of exhaust gas will require additional fresh air during most operating conditions. The distribution of the added air can be used to increase the flow of air through the separators 10′ and 10″ during low throughputs by admitting additional air prior to the separators at low engine speeds while admitting additional air to the system after the separators at high engine speeds. In this way the minimum throughput of the separators (engine throughput plus fresh air) is made greater than the minimum throughput of the engine, and the percentage change from minimum to maximum throughput of the separators is reduced.

A simplified arrangement for accomplishing this is shown in FIG. 2 wherein an air source 40 is connectable by either a pipe 41a or a pipe 41b to the inlet pipe 12 or to the exhaust tube 21, respectively, depending upon the position of a control valve 42. The control valve 42 is operable in accordance with engine speed. Thus a minimum throughput of the free vortex separator may be increased from 10 c.f.m. to 20 c.f.m.

Figure 3:
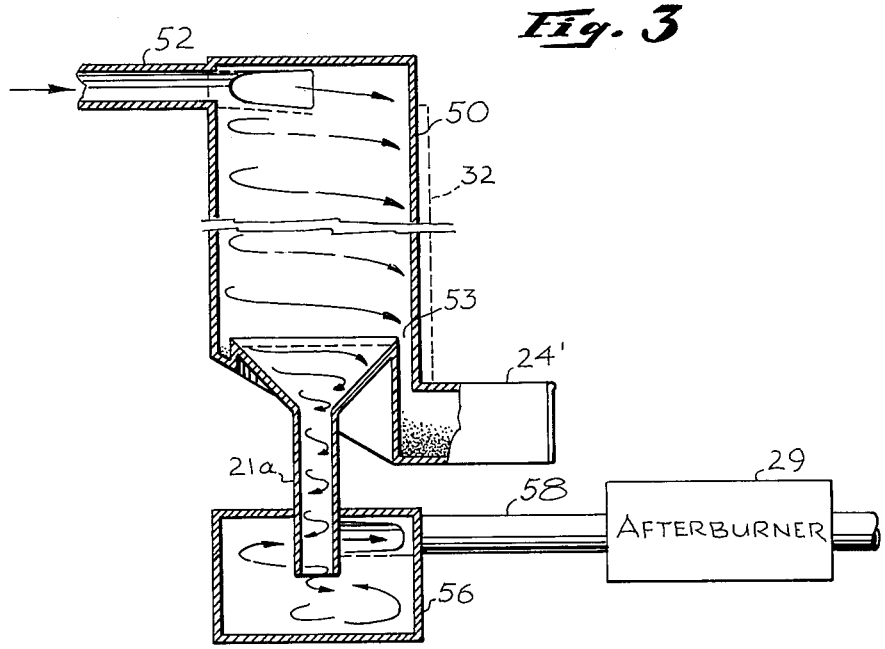
FIG. 3 is a cutaway view of a portion of another embodiment of the invention.

Referring now to FIG. 3 there is shown another embodiment of this invention wherein there is provided a simple cyclone separator 50 having a tangential inlet pipe 52 whereby the exhaust gas will rotate at high speeds and will cause the heavy compounds to flow downward along the outer surface where they will be collected in a tangential slot 53 and maintained in a container 24′.

In order to reduce pressure losses of the separator 50, the cleaned exhaust gas will pass through an exhaust tube 21a to a pressure recovery device 56 wherein the rotating gas is removed by a tangentially connected exhaust tube 58 and conducted to the afterburner 29. The pressure recovery device 56 comprises a chamber that has a substantially larger diameter than the exhaust tube 21a whereby the exhaust gas flow path is increased and a portion of the kinetic energy is converted into static or pressure energy. Also the provision of a tangential connection of the exhaust tube 58 increases further the conversion of kinetic energy to pressure energy. Obviously the pressure recovery device 56 could be used with the vortex separator 10.

Figure 4:
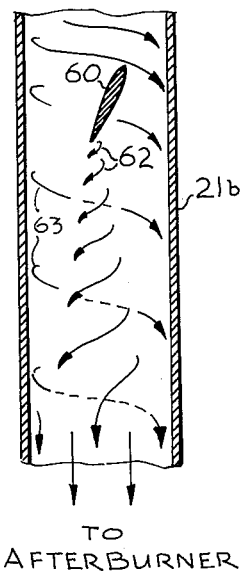
FIG. 4 is an enlarged cutaway view of a portion of a further embodiment of the invention.

Another type of pressure recovery device is shown in FIG. 4 wherein an air foil 60 is placed in the exhaust tube 21b to provide a counterflow vortex shown by arrows 62 at the center of the vortex (arrows 63) caused by the separators 10 or 50. The size and angle of attack of the air foil 60 are selected so that the counterflow vortex 62 will substantially counteract the vortex 63 caused by the separator to provide substantially linear flow to the afterburner 29.

In summary, the separation of heavy compounds prior to admitting the exhaust gas into an afterburner system will reduce contamination of the afterburner and will extend its life. This increase of the life of the afterburner 29 will be particularly noticeable in the catalytic type afterburner wherein the lead compounds tend to poison the catalytic agents. Thus the system comprises a separator connected between the exhaust gas source and the afterburner, and preferably includes means for reducing pressure drop and other losses across the system.

While there are shown several embodiments of the invention other modifications thereof will occur to those skilled in the art. For instance an airfoil, equivalent to that shown, may be designed to produce a cleaning vortex as well as a pressure recovery counterflow vortex. Moreover, it may prove feasible to separatae lead compounds and the like by a mat of filter material which might require periodic maintenance to prevent clogging. Therefore, it is intended by the appended claims to cover all such modifications as fall within the true spirit and scope of this invention.

I claim:
1. In an apparatus for treating the exhaust gas of an internal combustion engine, the combination of:
   an afterburner subject to contamination by particles in said exhaust gas;
   an exhaust conduit connected to said engine;
   a separator disposed in said exhaust conduit, said separator including a housing defining a vertically disposed generally cylindrical chamber having end walls;
   means for introducing said exhaust gas from said conduit tangentially into said chamber adjacent one of said end walls whereby to induce a vertical motion to said exhaust gas in said chamber;
   collector means positioned peripherally about and below a lowermost of said end walls and communicating with said chamber, centrifugally disposed heavier particles in said exhaust gas being adapted for gravitational disposition into said collector means;
   gas discharge means positioned coaxially through said one of said end walls and adapted for reception of exhaust gas flowing in a free axial vortex in said chamber;
   and means connecting said afterburner to said exhaust conduit downstream and adapted for reception of exhaust gas from said separator.

2. In an apparatus for treating the exhaust gas of an internal combustion engine, the combination of:
   an afterburner subject to contamination by particles in said exhaust gas;
   an exhaust conduit connected to said engine;
   a separator disposed in said exhaust conduit, said separator including a housing defining a vertically disposed generally cylindrical chamber having end walls;
   means for introducing said exhaust gas from said conduit tangentially into said chamber adjacent an uppermost of said end walls whereby to induce a vortical motion to said exhaust gas in said chamber;
   collector means positioned peripherally about and below a lowermost of said end walls and communicating with said chamber, centrifugally disposed heavier particles in said exhaust gas being adapted for gravitational disposition into said collector means;
   gas discharge means positioned coaxially through said uppermost end wall and adapted for reception of exhaust gas flowing in a free axial vortex in said chamber;
   a plurality of openings in said housing for extracting a portion of said gas and said particles in a boundary layer of said gas flowing in said chamber;
   conduit means for receiving said portion of said gas and said particles, said conduit means communicating with said collector means;
   and means connecting said afterburner to said exhaust conduit downstream and adapted for reception of exhaust gas from said separator.

3. In an apparatus for treating the exhaust gas of an internal combustion engine, the combination of:
   an afterburner subject to contamination by particles in said exhaust gas;
   an exhaust conduit connected to said engine;
   a separator disposed in said exhaust conduit; said separator including a housing defining a vertically disposed generally cylindrical chamber having end walls;
   means for introducing said exhaust gas from said conduit tangentially into said chamber adjacent an uppermost of said end walls whereby to induce a vortical motion to said exhaust gas in said chamber;
   collector means positioned peripherally about and below a lowermost of said end walls and communicating with said chamber, centrifugally disposed heavier of said particles in said exhaust gas being adapted for gravitational disposition into said collector means;
   gas discharge means positioned coaxially through said uppermost end wall and adapted for reception of exhaust gas flowing in a free axial vortex in said chamber;
   a plurality of spaced openings in said housing defining said cylindrical chamber for extracting at least a portion of said gas and said particles in a boundary layer of said gas flowing in said chamber;
   conduit means for receiving said portion of said gas and said particles, said conduit means communicating with said collector means;
   means connecting said afterburner to said exhaust conduit downstream and adapted for reception of exhaust gas from said separator;
   and an acoustical barrier disposed in said exhaust conduit upstream from said separator.

4. In an apparatus for treating the exhaust gas of an internal combustion engine, the combination of:
   an afterburner subject to contamination by particles in said exhaust gas;
   an exhaust conduit connected to said engine;
   a separator disposed in said exhaust conduit, said separator including a housing defining a vertically disposed generally cylindrical chamber having end walls;
   means for introducing said exhaust gas from said conduit tangentially into said chamber adjacent an uppermost of said end walls whereby to induce a vortical motion to said exhaust gas in said chamber;
   collector means positioned peripherally about and below a lowermost of said end walls and communicating with said chamber, centrifugally disposed heavier of said particles in said exhaust being adapted for gravitational disposition into said collector means;
   means to open said collector means to atmosphere;
   gas discharge means positioned coaxially through said uppermost end wall and adapted for reception of exhaust gas flowing in a free axial vortex in said chamber;
   a plurality of openings in said housing for extracting a portion of said gas and said particles in a boundary layer of said gas flowing in said chamber;
   conduit means for receiving said portion of said gas from said openings for thereafter delivery to said collector means;
   means connecting said afterburner to said exhaust conduit downstream and adapted for reception of exhaust gas from said separator;
   and an acoustical barrier disposed in said exhaust conduit upstream from said separator.

References Cited in the file of this patent

UNITED STATES PATENTS

| 1,716,481 | Bilsky | June 11, 1929 |

FOREIGN PATENTS

| 338,933 | Great Britain | Nov. 24, 1930 |
| 525,103 | Great Britain | Aug. 21, 1940 |

UNITED STATES PATENT OFFICE

CERTIFICATE OF CORRECTION

Patent No. 3,056,662                      October 2, 1962

Stuart L. Ridgway

It is hereby certified that error appears in the above numbered patent requiring correction and that the said Letters Patent should read as corrected below.

Column 6, line 47, after "exhaust" insert -- gas --.

Signed and sealed this 10th day of September 1963.

(SEAL)
Attest:

ERNEST W. SWIDER
Attesting Officer

DAVID L. LADD
Commissioner of Patents